(12) United States Patent
Choate

(10) Patent No.: US 7,356,606 B2
(45) Date of Patent: Apr. 8, 2008

(54) DYNAMIC WEB STOREFRONT TECHNOLOGY

(75) Inventor: Eric P. Choate, Berkeley, CA (US)

(73) Assignee: Kagi Corporation, Berkeley, CA (US)

( * ) Notice: Subject to any disclaimer, the term of this patent is extended or adjusted under 35 U.S.C. 154(b) by 880 days.

(21) Appl. No.: 10/798,285

(22) Filed: Mar. 12, 2004

(65) Prior Publication Data

US 2005/0204281 A1    Sep. 15, 2005

(51) Int. Cl.
*G06F 15/16* (2006.01)
(52) U.S. Cl. ..................................... 709/232
(58) Field of Classification Search ........ 709/217–219, 709/232
See application file for complete search history.

(56) References Cited

U.S. PATENT DOCUMENTS

| | | | |
|---|---|---|---|
| 6,154,738 A | 11/2000 | Call | |
| 6,226,675 B1 | 5/2001 | Meltzer et al. | |
| 6,263,332 B1 | 7/2001 | Nasr et al. | |
| 6,915,328 B2 * | 7/2005 | Turnbull | 709/203 |
| 7,003,528 B2 * | 2/2006 | Dan et al. | 707/102 |
| 7,225,462 B2 * | 5/2007 | Bass et al. | 726/6 |
| 7,240,125 B2 * | 7/2007 | Fleming | 709/246 |
| 7,275,085 B1 * | 9/2007 | Tran | 709/217 |
| 2001/0014900 A1 | 8/2001 | Brauer et al. | |
| 2001/0044794 A1 | 11/2001 | Nasr et al. | |
| 2001/0056460 A1 | 12/2001 | Sahota et al. | |
| 2002/0038351 A1 | 3/2002 | Khan et al. | |
| 2002/0045951 A1 | 4/2002 | Maesaka et al. | |
| 2002/0049790 A1 | 4/2002 | Ricker et al. | |
| 2002/0059344 A1 | 5/2002 | Britton et al. | |
| 2002/0099735 A1 | 7/2002 | Schroeder et al. | |
| 2002/0122060 A1 | 9/2002 | Markel | |
| 2002/0147656 A1 | 10/2002 | Tam et al. | |
| 2004/0044961 A1 | 3/2004 | Pesenson | |

OTHER PUBLICATIONS

Mesbah, "Web-Based XML Editing With W3C XML Schema and XSLT", pp. 1-6, 2003.
Mesbah et al., "Web-Based XML Editing With W3C XML Schema and XSLT, Part 2", http://www.xml.com/pub/a/2003/06/25/editing.html, pp. 1-3, 2003.
Kochhar, "Posting HTML Form Data as XML Strings", Sams Publishing, 'Online !, URL:http://www.samspublishing.com/articles/printerfireindly.asp?p=21906>, Jun. 29, 2001.
Generating Hierarchical XML Data From a Flat (Non-Hierarchical) Data Source), International Business Machines Corporation, Research Disclosure, Kenneth Mason Publications, vol. 451, No. 156, Nov. 2001.
Mercay et al., "Boost Struts With XSLT and XML", Javaworld, 'Online!, URL:http://www.javaworld.com/javaworld/jw-02-2002/jw-0201-strutsxslt_p.html>, Feb. 2002.

* cited by examiner

*Primary Examiner*—Krisna Lim
(74) *Attorney, Agent, or Firm*—Diederiks & Whitelaw PLC

(57) ABSTRACT

A computer implemented method of conducting commerce over the Internet wherein a customer uses a client machine to request a web page through the Internet and a web server receives the request and sends a web page in hypertext mark up language (HTML) format that presents the customer with a form. The customer then enters information regarding a transaction at a web store. The form is set up so that the form values, i.e., the name of each variable, implies a way to store the variable's data in a database located in a web server. The forms data is processed into extensible markup language (XML) objects. By using XML path information in the HTML form variable names, the server is able to convert the HTML input into XML objects. This methodology allows the addition of any input fields without having to modify the code or programs residing on the server to accommodate these changes.

11 Claims, 4 Drawing Sheets

DYNAMIC WEB STOREFRONT TECHNOLOGY

BACKGROUND OF THE INVENTION

1. Field of the Invention

In general, the present invention relates to the field of displaying web pages via the Internet and, more particularly, to a system that can easily store data related to the web pages in extensible markup language (XML).

2. Background

Increasingly, buyers and sellers involved in commerce are turning to the Internet to conduct their business electronically in a relatively fast and quick manner. The Internet is particularly attractive to buyers because it provides a vast knowledge base from which they can research and find information about respective purchases of various goods. Time can be saved because a consumer does not have to travel to various places, such as libraries or stores, to obtain information regarding the various goods to be purchased. Indeed, the entire process of shopping for goods and services can be completed using a personal computer at one's home so long as the computer is connected to a network such as the Internet.

Likewise, using the Internet for commerce is extremely attractive to businesses as they can provide the same type of information to consumers that was traditionally provided through catalogs or other advertising, but at much lower cost. Furthermore, transactions can occur between customers and sellers in a similar manner as customarily done at a checkout stand in a store. Indeed, in the case of all digital products, such as computer software, videos, music or funds transfer, the goods or services themselves can be delivered through the Internet and payment can be received through the Internet so that the entire transaction occurs through a computer network without the consumer or merchant ever actually meeting in a store. This method of doing business provides tremendous cost savings to manufacturers and sellers. Even items that have to be physically shipped can benefit from this form of commerce. Once a customer browses a merchant's website and selects various goods to purchase, the merchant simply needs to verify the use of the payment instrument and then ship the goods to the customer.

Typically, a merchant provides what is known as a web-store or an Electronic commerce store on the web. That is, the merchant either has a web server or uses a web server to create the store and the customer has client software to view the store. The client software can be any piece of code or software that resides on a computer, telephone, or any other type of computing/communication device that can talk to another computer such as a server. Typically, the client software is simply a standard piece of software such as a web browser. Typical web browsers on the Internet would include, for example, NETSCAPE NAVIGATOR or INTERNET EXPLORER. Such browsers provide a graphical user interface for retrieving and reviewing web pages found on web servers.

In order for the client web browser to function properly, the web server must send information in a format that the web client can display in a useful manner. Mainly, browsers will use hypertext transfer protocol (HTTP) via transmission protocol/Internet protocol (TCP/IP) to pass information back and forth between the web browser and web server. The actual document read by the web browser will most likely be in Hypertext Mark up Language (HTML). In addition, web browsers can read and display any type of text document.

Originally, web servers were designed just to present data. The data was transferred via the Internet by the above mentioned protocols in the HTML format and web browsers would simply present the data to an end user in a graphical manner. A browser would simply go to the web server and request a certain file and the web server would present the data in the HTML format such that the file would be transmitted to the web browser and a user could see something displayed on the screen in a graphical format. For example, a scientific paper about particle acceleration in a lab might be processed in this manner.

As technology has advanced on the Internet, web servers have become more complex and have gone beyond simply presenting a text document. For example, databases are now common on web servers. For example, if one wished to look up a telephone number, instead of having the web server send the entire phone book through the Internet as a large text document to a web browser, it is desirable to simply send the phone number. Essentially, software on the server has been developed that responds to a request for a phone number by determining what the phone number is from the large text file of a whole phone book, converting the answer into an HTML document and sending the answer to a web server as though it was a full text file. Therefore, a user would simply be able to see the single phone number, as opposed to all the phone numbers within the database. Essentially a text file is specially created for that one moment to respond to that one request. The text file does not actually exist in a database, rather the client web browser simply receives a HTML document that was requested. In fact, the browser is simply getting a set of data created based on the browser's query.

Currently, Electronic commerce stores are based on this interaction of data being sent from the client to a server. The server then processes the data and sends the data back to the web browser in a certain format. In the process of sending data back and forth, ultimately a purchase transaction occurs. Of course, this transaction is much more complex than simply retrieving a phone number. There may be a full list of different types of products available such as T-shirts or other clothing. Additionally, the clothing could have certain attributes such as different colors and prices.

The problem with this exchange of data is that the server has to remember all the previous data. For example, if a customer were to ask for a T-shirt and then request that the shirt be a blue T-shirt, the server would have to remember the customer was asking about T-shirts initially and that now the request is for a blue T-shirt rather than, for example, a blue set of long johns. All the information about the transaction, such as color, size and price, must be remembered in each session. In order to make this process work, typically the data used for each session is stored in what is referred to as a "shopping cart", essentially modeling the process on the idea of going through a grocery store with a shopping cart and putting various products having various attributes within the cart which may be purchased at a later time.

Additional information might also be important, such as the location of the purchaser. If, for example, the purchaser lives in another country, such as Turkey, a cash payment simply will not work. Perhaps the only payment that might work is through a credit card, such as a VISA card, which may necessitate some currency exchange transactions based on the purchase. A lot of different data has to be collected and stored during this type of session.

Also, most store owners on the Internet would like their shop to look unique. In addition to the overall look of the store, store owners would like to tailor what information is collected from the customer and how various input fields are arranged on the customer's computer screen. A typical Electronic commerce store may address this problem by collecting a bunch of data in a pre-set step by step conversation in each customer session. On a first page, the web server asks exactly what is being bought out of a list. The second page in the session asks how the user is going to pay for the items selected. The third page will indicate whether or not the transaction will go forward, followed by authorization of the financial instrument. The system is fairly simple because there are only three pages, three interactions and the interactions always process the same information in the same order. If the transaction had not proceeded in this order, and if a customer changed his or her mind, the entire transaction would have to re-start from the beginning. The advantage is that the server knows exactly what information is going to come back at exactly what time so it can be stored easily by the server. Essentially, the customer fills out a form such that the data is sent in exactly the correct format because all the data elements are strictly defined. This sort of system works fairly well so long as all the variables to be used in the session are known ahead of time. However, the order and number of the steps cannot be changed.

Therefore, if a store is going to sell encryption software, for example, it needs to know in what country the customer resides before the store can show an order page because encryption software cannot be sent to certain countries. This is a different business process in that the order of presentation of the data has been changed. Such a change requires essentially an entire rewrite of the software residing on the web server and is extremely expensive. In simple terms, a store A could be designed to process a certain order form and payment information, while a store B could be designed to process almost the same order form and payment information, yet the entire code would have to be rewritten to change store A into store B. Indeed for every single minor change to the process of asking for information, a relatively large amount of code must be rewritten.

More specifically, stores have been made with HTML, requiring a backend script or program unique to each store. Such scripts generally expect to see variables input in a particular manner and order. The variable names are generally incorporated into the script and therefore are not easily modified. Of course, when a storeowner wishes to collect custom or additional information from a customer, the backend script or code must be changed to accommodate the new data coming into the web page.

Currently each store has an HTML form that is sent to a client computer into which customers enter information. The customer fills out the form and then the form data is sent to the storeowner's server. For example a traditional HTML input form may use the following variables:

```
<input name="name">
<input name="street">
<input name="city">
<input name="state">
<input name="zip">
```

A web server then parses the form data and collects the various pre-specified variables from the parsed form data. The data is then inserted into an organized database by the web server. Next, the web server creates a HTML response page which is transmitted to the customer and appears as a web page on the client computer.

However, a small change in the web store quickly illustrates the problem with this traditional HTML form. Say the store owner wished to collect the customer's first and last name. The form code would have to be modified to handle the new variables. A similar problem occurs when a store wants to group information about a product that a customer is buying, such as product size or color.

Another approach to the problem has been the use of electronic commerce stores which are relatively configurable. Essentially, these electronic commerce stores are programs that reside on web servers that have a tremendous number of options all preprogrammed. However, if the programmer has not thought of all the possible ways a merchant would like to configure the store, an extensive rewrite is necessary. Furthermore, the costs of writing a program with a large number of preprogrammed options is expensive.

Based on the above, there exists a need in the art for a piece of software that resides in a web server that can be easily adapted to many different types of Electronic commerce web stores.

SUMMARY OF THE INVENTION

The subject invention provides a way of conducting Electronic commerce over the Internet using web stores that are easily modified and avoid the problem of having to completely rewrite the server code to make small changes in a web store. The form data used in the various web stores is processed into eXtensible Markup Language (XML) objects. By using XML path information in the HTML form variable names, the server is able to convert the HTML input into XML objects. This methodology allows the addition of any input fields without having to modify the backend code residing on the server to accommodate the changes.

More specifically, the process proceeds with the customer using a client machine to request a web page through the Internet or some other network. The web server receives the request and sends a web page in HTML format that presents the customer with a form. The customer then enters information into the form regarding a transaction in the web store. The form is set up so that the form values, i.e., the name of each variable, implies a way to store the data in a database located on the web server. For example, instead of the traditional store variables listed previously, the following variables would be used:

```
<input name="/customer/name/first">
<input name="/customer/name/last">
<input name="/customer/address/street">
<input name="/customer/address/city">
<input name="/customer/address/state">
<input name="/customer/address/zip">
```

The variables are then sent through the Internet to the web server. The web server code then parses the form variables and, because the names of the variables indicate where and how the data should be stored, the web server stores the data according to the variable names. This is distinct from the prior method of storing the data according to a predetermined algorithm defined by the back end code in the web server. For example the following XML type document could be built from the variable names listed above:

```
<customer>
    <name>
        <first></first>
        <last></last>
    </name>
    <address>
        <street></street>
        <city></city>
        <zip></zip>
    </address>
</customer>
```

By inspection, we can see that the various positions of variables in the data are derived from the variable names. Once the data has been stored in the database, the web server creates the next web page. Such a web page can easily be created by merging the data from the XML document with an eXtensible Stylesheet Language Transformation (XSLT) template to form an HTML document, and sent to the client machine. This action, of course, enables the customer to see the next web page.

The great advantage of this process is that user data collected and displayed does not need to be pre-specified to the web server code. The way the input data is named tells the web server code how to organize the data without having to know exactly what the data is and in what order it will be received.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
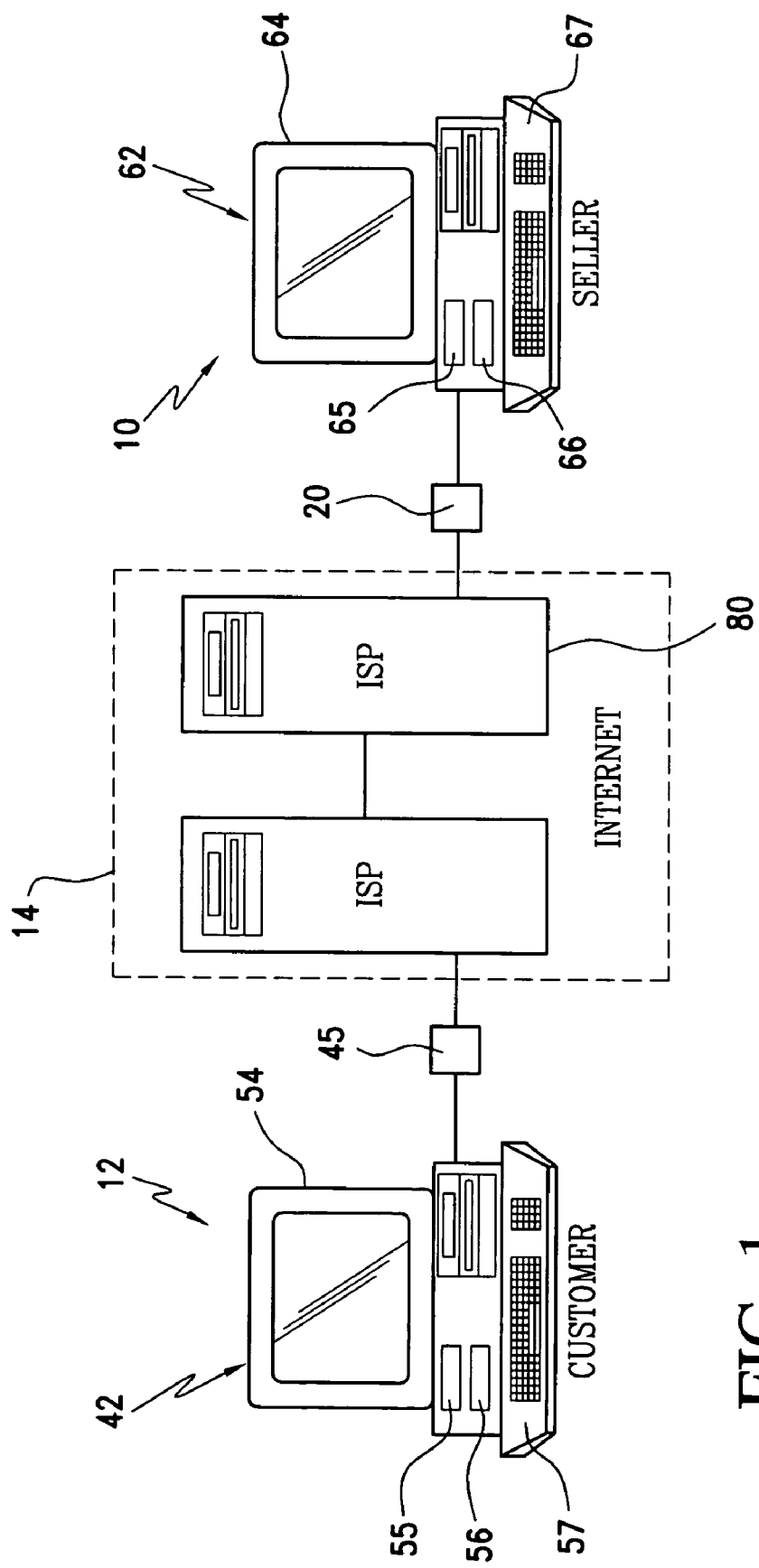
FIG. 1 is a diagram of a system with computers interconnected by the Internet for conducting commerce over the Internet in accordance with a first embodiment of the invention.
Figure 2:
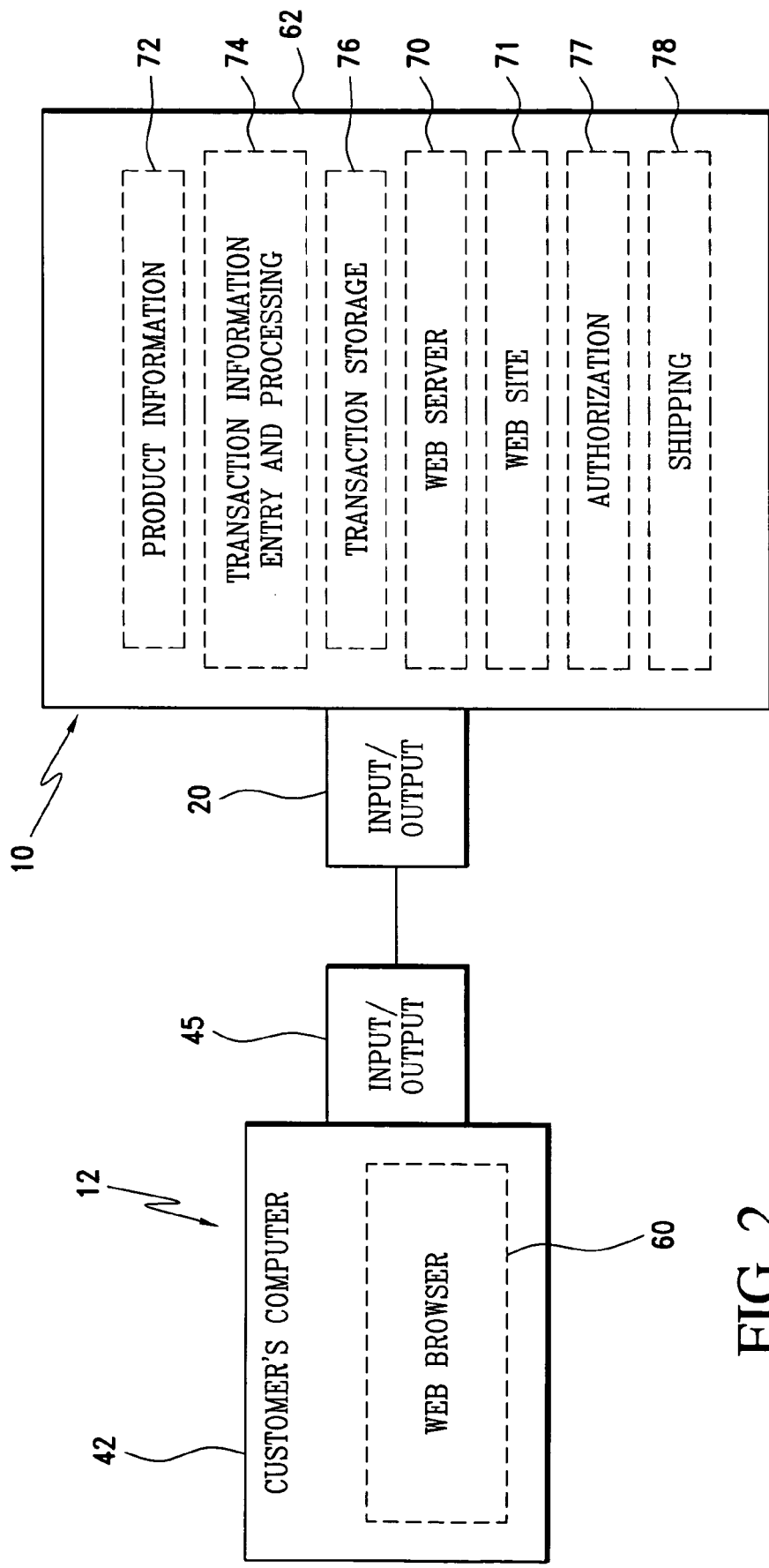
FIG. 2 is a block diagram illustrating in more detail the first preferred embodiment of the invention shown in FIG. 1.
Figure 3:
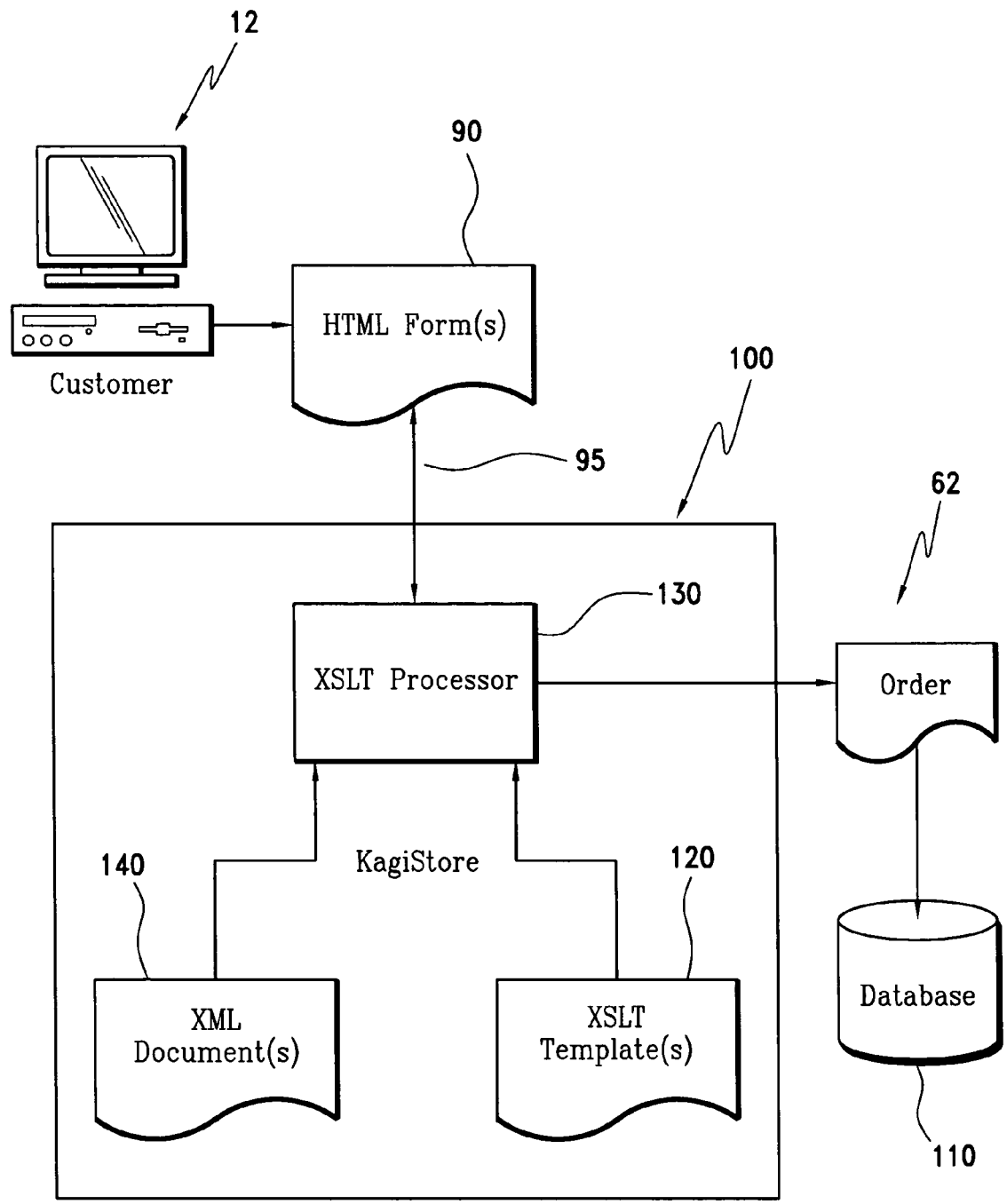
FIG. 3 is a block diagram illustrating in more detail the first is preferred embodiment of the invention shown in FIG. 1.

FIG. 1 details a first preferred embodiment in which a system for conducting commerce over the Internet includes a seller's computer system 10 which can be selectively called upon by one or more customer computer systems 12 over an electronic communications link such as the Internet 14. As illustrated in FIGS. 1-3, seller's computer system 10 is formed of one or more computers 62, and includes an input-output unit 20 for transmitting and receiving digital information to or from the Internet 14 and indirectly to a customer's computer 42. Likewise, a customer's computer 42 is also set up to contact the Internet 14 through an input-output unit 45. Customer's computer 42 typically has a monitor 54, a central processing unit 55, some type of memory 56 and an input-output unit such as a keyboard 57. Typically when in use, customer's computer 42 would have some type of operating system such as Macintosh, Unix, Windows, which would run the basic operations of the computer 42. Additionally, specialized applications such as a web browser 60 would be used to interpret the various protocols of the Internet 14 into an understandable interface for a computer user, namely the customer.

In a similar manner, a seller's computer 62 may be formed of one or more computers, having one or more monitors 64, a central processing unit 65, some type of memory 66 and an input-output device such as a keyboard 67. Additionally, various applications such as a web server 70 and/or specialized applications that form a website 71 providing information regarding seller's products 72, and additional applications designed to process financial transactions 74 and/or provide a database 76 for remembering and storing various bits of information regarding the various customers visiting the seller's website. Further, seller's computer 62 has the programming to compare inputted data 77 and authorize shipping of goods 78.

Although in theory seller's computer system 10 could be part of any data network, most preferably seller's computer system 10 is connected to the Internet 14 or an Internet service provider (ISP) 80 by a high speed integrated service digital network (ISDN), a T-1 line, a T-3 line or any other type of system that communicates with other computers or ISP's through the Internet 14.

FIG. 3 shows a more specific application of the invention's preferred embodiment, in which the customer's computer 12 is able to process HyperText Markup Language (HTML) forms 90. A pair of arrows 95 represents information that may include variables flowing to and from the customer's computer 12. As in FIG. 2, customer's computer 12 may be communicating with a seller throughout an entire transaction. However, in this case the seller may be using multiple servers. One server may handle displaying an overall website while some portions of the website may actually transfer a customer to a second server to handle a different part of the transaction. For the sake of discussion, we will assume the customer is communicating with a single server through the Internet 14 and that a certain program or script that resides and operates on the server is of interest here. For simplicity sake we will call the program or script a "store" 100.

In the preferred embodiment of the invention the information may be passed to store 100 using parameters. The parameters may be passed in one of three ways:

1) In the calling URL. I.e., ?storeID=ABC&lang=en
2) In the form of hidden HTML form fields. I.e., <input type="HIDDEN" name="lang" value="en">
3) Or as browser cookies.

Here is a list of common store Parameters:

| Parameter | Description |
| --- | --- |
| storeID | Usually a multi character Supplier code that identifies the store. |
| Action | The action that this invocation of the store is expected to carry out. |
| View | The XSLT template that will be used in processing the output. |

-continued

| Parameter | Description |
|---|---|
| OrderID | The Id of the current transaction. |
| CustomerID | The Id of the current customer. |
| Currency | The currency the customer wishes to view the prices/order totals in. |
| Lang | The language the customer wishes to view the store in. |
| Product ID | The Id of a specific product for purposes of viewing the details of that product. |
| ItemID | The Id of an item in the shopping cart. |
| Shipping/method | The desired shipping method. |
| SetCookie | If true we will set a cookie in the Customer's browser that remembers their customer ID for the next time they visit us. |
| Customer/* | Where * is any XML path. The path, and the associated value will be either added or updated in the customer XML object of the current transaction. |
| Order/* | Where * is any XML path. The path, and the associated value will be either added or updated in the order XML object of the current transaction. |
| Product/<product ID>/<itemID>/<attribute> | Where product ID is the ID of the product in the product.xml document. Item ID is the ID of the item in the current shopping cart, or 0 for an item that has yet to be added to the cart. Attribute is the name of any attribute to be set related to this item in the shopping cart. Most generically this will be "quantity". |

Additionally, located in the server is a database 110. Database 110 contains numerous eXtensible Markup Language (XML) documents 140 organized into sets. At least one set of XML documents 140 is a default set of documents that is used by store 100. XML documents 140 are arranged so that all the data that drives store 100 is stored in XML Objects. All data from configuration information, to order and customer information, to pull down lists, is stored in these Objects. By using XML Objects store 100 is able to completely separate the data from the presentation of data and maintain a highly organized and easily modifiable form. Below is a list of proposed Objects:

| Objects | Description |
|---|---|
| Products.xml | Contains the product configuration information, including, for example, product ID, name, description, price, attributes, shipping weight, etc..<br>Example:<br><products><br>  <product id="0000-0000-0000-0001" taxable="YES"><br>    <name>T-Shirt</name><br>    <desc>The cheesy T you can't live without</desc><br>    <price quantity="1–10" currency="USD">20.95</price><br>    <price quantity="11–999" currency=USD>18.00</price><br>    <image>cheese.gif</image><br>    <attribute name="Size" required="YES"><br>      <option>S</option><br>      <option>M</option><br>      <option>L</option><br>    </attribute><br>    <weight>1</weight><br>  </product><br></products> |
| shipping.xml | Contains the shipping methods available.<br><shipping><br>  <method name="UPS Ground (US)" id="1"><br>    <base>3</base><br>    <costperunit currency="USD">1</costperunit><br>  </method><br>  </method name="FedEx (US)" id="2"><br>    <base>15</base><br>    <costperunit currency="USD">5</costperunit><br>  </method><br></shipping><br>Where base is the minimum charge per order, and costperunit is the cost that will be multiplied by the <weight> * <quantity> of each item. |
| Discounts.xml | Contains the order total discount scheme.<br>Example:<br><discounts><br>  <discount currency="USD" id="1"min="100"max="200">5</discount> |

-continued

| Objects | Description |
|---|---|
| | <discount currency="USD"id="1"min="201"max="99999999">10</discount> </discounts> In this example if the order total is between 100 and 200 there will be a 5% discount on the entire order, if the order total is between 201 and a bazillion, there will be a 10% discount. |
| Order.xml | Contains the order data for the current transaction. |
| Customer.xml | Contains the customer data for the current transaction. |
| Rates.xml | Contains currency exchange rates. |
| paymethods.xml | Contains payment instrument, and currency options available to the Customer. |
| Tax.xml | Contains the tax schedule based on location. |
| Vendor.xml | Contains Supplier data for the store "owner". |
| cards.xml | Contains the list of credit cards. |
| Currencies.xml | Contains the list of currencies. |
| Lang.xml | Contains translated language keys. |
| Languages.xml | Contains the list of languages supported. |
| Months.xml | Contains the list of months. |
| Years.xml | Contains the list of years. |
| Countries.xml | Contains the list of countries. |

In addition to the objects listed above, database 110 stores a collection of extensible Stylesheet Language Transformation (XSLT) templates 120 that may be combined with XML data in documents 140 in order to create web pages. Templates 120 are responsible for how the web pages appear or how the data is presented. Through the use of an XSLT processor 130 the XML objects are "merged" with templates 120 to create the dynamic output in HTML format for the customer. A preferred set of templates is shown below:

| Template | Description |
|---|---|
| products.xsl | This template displays the catalog or product list. |
| Details.xsl | This template displays the expanded details of a single product. |
| Cart.xsl | This template displays the shopping cart. |
| Checkout.xsl | This template gathers the customer information. |
| Receipt.xsl | This template displays the "thanks page" for card purchases. |
| Invoice.xsl | This template displays the "thanks page" for cash/check/purchases. |
| Email.xsl | This template is used to convert the customer and order XML objects into an email format. |
| Site.xsl | This template contains the "global" look and feel of the site. |
| Declines.xsl | This template displays when a sale is declined. |
| Paymethods.xsl | This template displays the vast array of payment and currency options available to the customer. |

All store XML documents 140 are located under a root directory on the web server 70. For example: /var/local/orderdata/stores. A copy of these files may be stored in a database 110 and are sent to a local system when modified. The directory structure according to a preferred arrangement is as follows:

```
/DEFAULT/site.xsl
        /products.xsl
        /detail.xsl
        /cart.xsl
        /checkout.xsl
        /receipt.xsl
        /invoice.xsl
        /en/lang.xml
```

-continued

```
        /en/cards.xml
        /<lang>/...
        /OPTION1
        /OPTION..N
/<STOREID>/store.xml
          /products.xml
          /vendor.xml
```

Where <STOREID> is generally the multi-character Supplier Code for any given Supplier. In addition to the three mandatory documents: store.xml, product.xml, and vendor.xml, any Supplier folder may contain a copy of any of the files or subfolders that are contained in the DEFAULT or OPTION folders. These copies can be modified to provide unique customization for any given Supplier.

When locating files to use, the store 100 will first look for the most specific file, then look up an "Order of Precedence" until it finds the file it needs to complete the action/view. An example of an "Order of Precedence" is as follows:

1) The specific supplier and specified language
2) The specific supplier and us_english
3) The option and specified language
4) The option and us_english
5) The default and specified language
6) The default When store 100 is first invoked by a customer sending a request, store 100 will take an "action". That is, store 100 will either perform some requested task or if no task is specified, store 100 will perform the default action of displaying a product page. If a specific action is requested then that action will be formed, assuming the action is valid. Normally an action will modify the customer and order objects in the XML database 110 that are associated with the transaction. A preferred set of "actions" is listed below:

| Action | Description |
|---|---|
| product (default) | This is the action that is used if no action is specified. It returns the catalog of products. |

-continued

| Action | Description |
|---|---|
| Cart | This action accepts products to be added, removed, or updated in the cart. The cart is displayed. |
| Checkout | This action ensures the order is ready for checkout, and displays a form requesting customer information. |
| Process | This action validates the order and customer objects and contacts the authorization system to obtain authorization. If approved, the "receipt" is displayed for card purchases, or the "invoice" for cash/check, and PO orders. Otherwise the "declined" message is displayed. |
| Remove | This action removes an item from the cart, and re-displays the cart. |
| Detail | This action will display a single product "detail" screen. |
| Paymethods | This action will display a table of payment options available. |

Each action requires a certain set of data inputs either as parameters or XML Objects in a certain state. If these requirements are not met, usually store 100 will send an error message. Upon successful completion of an action, an appropriate view is set up in store 100 and the presentation is sent to the customer. In other words once the action is complete, an associated "view" (XSLT template 120) will be merged with the resultant XML Objects. The merging will produce an HTML document 15 that is returned to the customer who sees it as a new web page.

Generating such HTML content dynamically is resource intensive. Although not required, preferably a system of template caching will reduce the strain on available computing power. Additionally, templates 120 should not contain any language specific static text in the root of any folder. All language text (English, Spanish, etc.) should be stored in separate language files. Further, to simplify text, pop up lists (i.e. country lists) should be replaced prior to runtime. In other words, all data that is relatively static should be "embedded" in the templates used by store 100 prior to runtime.

Indeed all of the customer purchase transactions are conducted with HTML forms 90 presented to the customer. Because HTML forms 90 are flexible, other client machines may be supported. For example, wireless application protocol (WAP) clients commonly used in cellular phones may be supported through the use of different XSLT templates 120. Store 100 can also duplicate current web store abilities by providing actions associated with a product page to display product information, a "checkout" action to gather customer data, and a "process" action to process a financial transaction which includes the step of contacting an authorization system. Once the order is completed the order information is sent to the supplier to ship the appropriate items and to the customer verifying the order.

The whole process can be adjusted to alter the language presented to the customer. Language keys may be placed in templates 120. These keys correspond to values in the lang.xml document. The selected language is determined by a lang=<lang> parameter submitted by the customer's web browser 60. If not specified, then the preferred language of browser 60 is used. A separate lang.xml document is created for each supported language. The language keys are replaced in each template 120 prior to the results being returned to each customer's computer 12. All language specific text should be replaced with language keys that can be found in the lang.xml documents. After the lang.xml file is changed, it will be merged with the root template to create a language specific template that will reside in a language subdirectory. If a language key has not been translated then the English value will be used. Text like the following placed in an XSLT template will be replaced with the proper language specific text to be displayed to the customer: <xsl:value-of select="//lang/pageTitle"/> where page Title is a language key that has been translated, and can be found in the lang.xml document.

Figure 4:
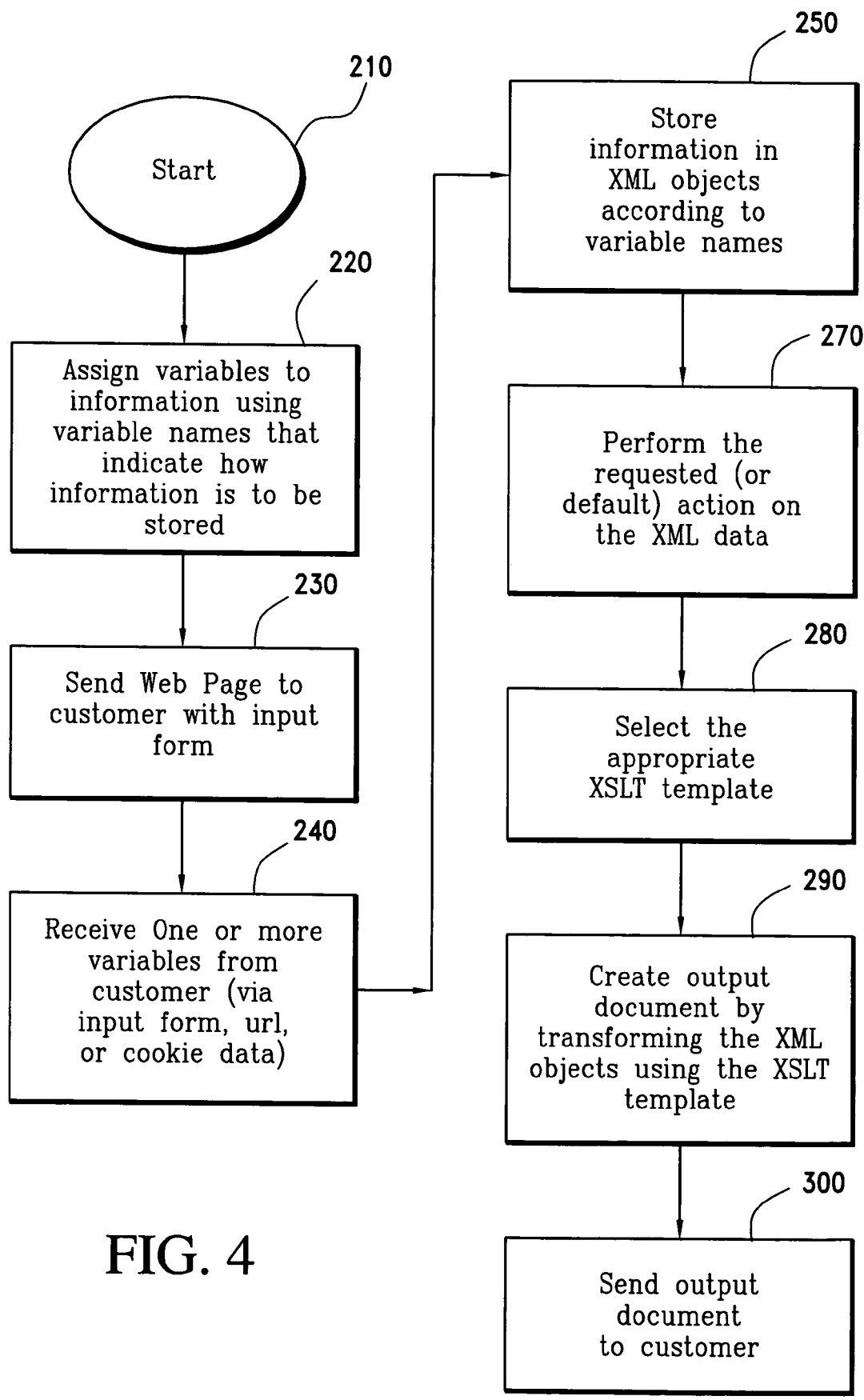
FIG. 4 is a flow chart of a computer procedure employed by the seller's computer according to a first preferred embodiment of the invention.

As shown in FIG. 4, the process of the store 100 proceeds with store 100 being activated at step 210. In step 220, variables are assigned to the different information that has to be stored. Each variable is assigned a name which indicates how the information is to be stored. Store 100 then, at step 230, sends a web page to a customer with an input form 90 displayed on customer's browser 60. The customer then enters the transaction information or data into form 90 at essentially what appears to be a web store. In step 240, the variables are sent through the Internet 14 to web server 70 via an input form, URL or cookies. In step 250, the web server code or store 100 parses the variables and arranges the data based on the names of the variables in a database 76. Next, the store 100 performs a requested or default action on the XML data in step 270. The store selects one of the XSLT templates 120 in step 280 which is appropriate for the next web page. In step 290, the next web page or output HTML document is created by merging the XML database objects with the selected XSLT template 120 using an XSLT processor 130. The output HTML document is essentially a new web page that is sent to the customer's computer 12 in step 300. The process continues with a different portion of store 100.

An example of a "store" 100 is represented by the following pseudo code:

```
set the currency and language to the values passed or set to defaults if the
storeID and action are valid
set the view to the view passed in or default to products
    if this is a new order
        generate an orderID
        create the order object with defaults
        add any order parameters passed in
    else
        read in the order from "file" based on the orderID
        add/or modify any order parameters passed in
    set the character encoding based on the language
    if this is a new customer
        generate a customerID
        create the customer object with defaults
        add any customer parameters passed in
    else
        read in the customer from "file" based on the customerID
        add/or modify any customer parameters passed in
    add/modify any products passed in
    if action is "checkout"
        add shipping
    if action is "process"
        total the order
        validate the customer and order
        if valid
            send the order to an authorization system
            if approved
                set order status=approved
                if card order
                    set the view to "receipt"
                else
                    set the view to "invoice"
            if declined
                set order status=declined
```

```
                -continued
            set the view to "declined"
        if error
            set order status=error
            set the view to "receipt"
            send email to report results
        else
            set order status=incomplete
            add error codes/messages to order
            set the view to "checkout"
        save the customer object
    if action is "detail"
        read the product from file matching "productID"
        set the view to "detail"
    if action is "cart"
        set the view to "cart"
    if action is "remove"
        remove the item from the cart matching "itemID"
    if action is "paymethods":
        read the paymethods file
    if the action is anything else
        read the products file
    total the order (including discounts, shipping, and tax)
    save the order
    save the customer
    read all other XML objects
    transform the XML objects using the XSLT template (the view)
    do post XSLT substitutions for legacy system compatibility
    return the resultant HTML page to the customer
else the storeID and or action are invalid
display an error
```

Although described with reference to a preferred embodiment of the invention, it should be readily understood that various changes and/or modifications can be made to the invention without departing from the spirit thereof. In general, the invention is only intended to be limited by the scope of the following claims.

I claim:

1. A method of conducting commerce with a server over the Internet comprising:
   receiving a request for a web page from a consumer;
   transmitting the web page over the Internet from the server to the consumer;
   prompting for information from the consumer through the web page;
   assigning variables with variable names to the information;
   incorporating XML path information into the variable names;
   submitting the variables to the server;
   reading the information from the variables;
   placing the information in an XML type format based on the XML path information; and
   creating another web page for the consumer.

2. The method according to claim 1, wherein the variables are transmitted in a universal resource locator.

3. The method according to claim 2, wherein any extra information in the universal resource locator is ignored by the web server.

4. The method according to claim 1, wherein the variables are transmitted in hidden HTML form fields.

5. The method according to claim 1, wherein the variables are transmitted by cookies.

6. An apparatus for conducting commerce over the Internet comprising:
   a web server for producing a web page having variables therein that incorporate data said variables having variable names that incorporate XML path information;
   client software for displaying the web page; and
   a connection formed over the internet for transmitting the web page from the server to the client software and the variables and variable names from the client software to the server, said server further including a database for storing the data in an XML type format based on the XML path information whereby said server creates another web page for the client software based on the data in the XML type format.

7. The apparatus according to claim 6, wherein the connection including means for transmitting the variables in a universal resource locator.

8. The apparatus according to claim 7, wherein the web server includes means for ignoring any information found in the universal resource locator other than the data and XML path information.

9. The apparatus according to claim 6, wherein the web page further includes hidden HTML form fields for transmitting the data and XML path information ovor the connection.

10. The apparatus according to claim 6, wherein the web page further includes cookies for transmitting the data and XML path information over the connection.

11. A method of conducting commerce over the Internet comprising the steps of:
   creating a first web page that presents a form for a customer to input information;
   assigning variables to information inputted by the customer, each variable having a name that indicates how the information is to be stored;
   transferring the variables to a central location;
   collecting the variables and storing the information in a database according to the name of each said variable; and
   creating a second web page based on the database and a template.

* * * * *